United States Patent Office 3,194,266
Patented July 13, 1965

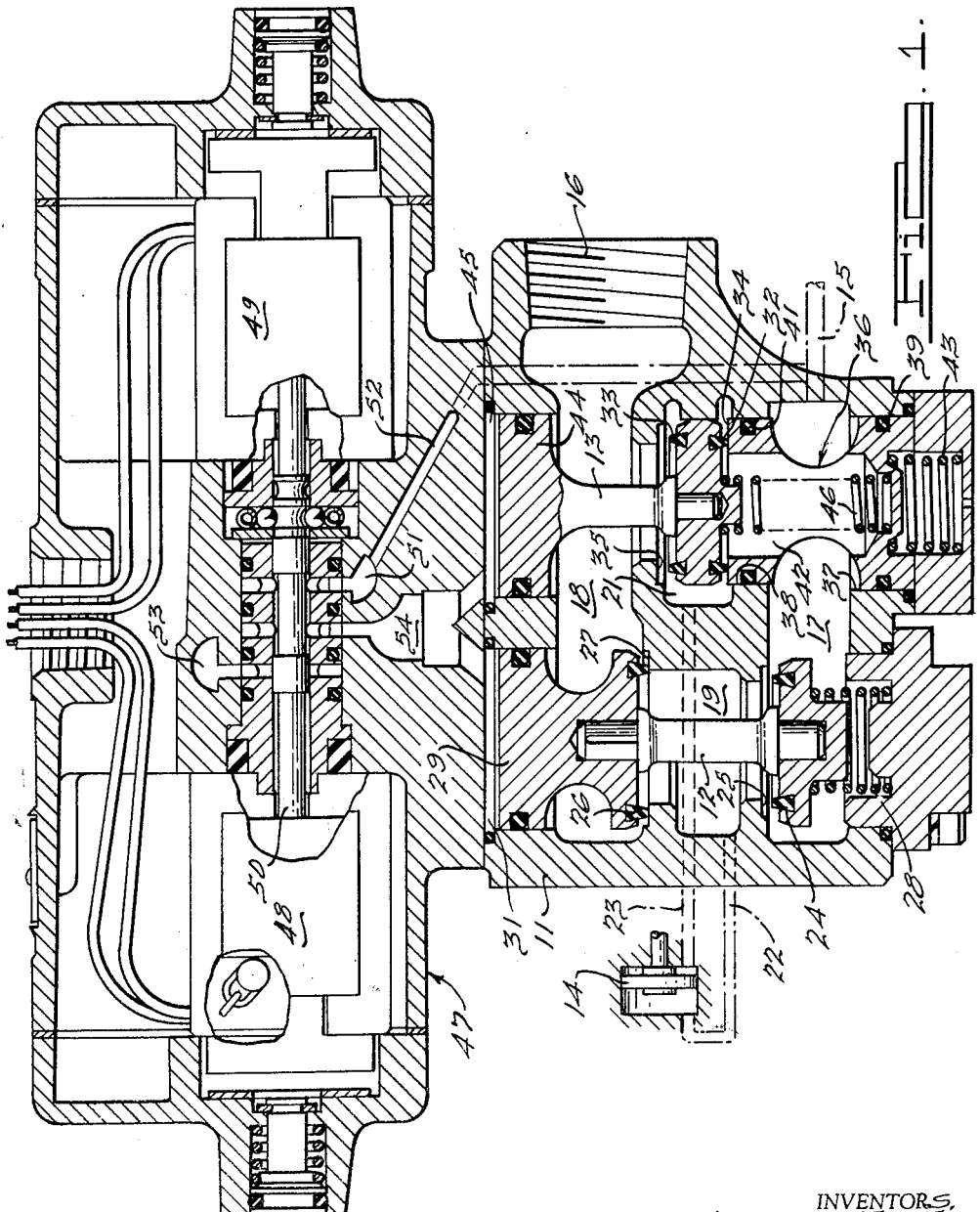

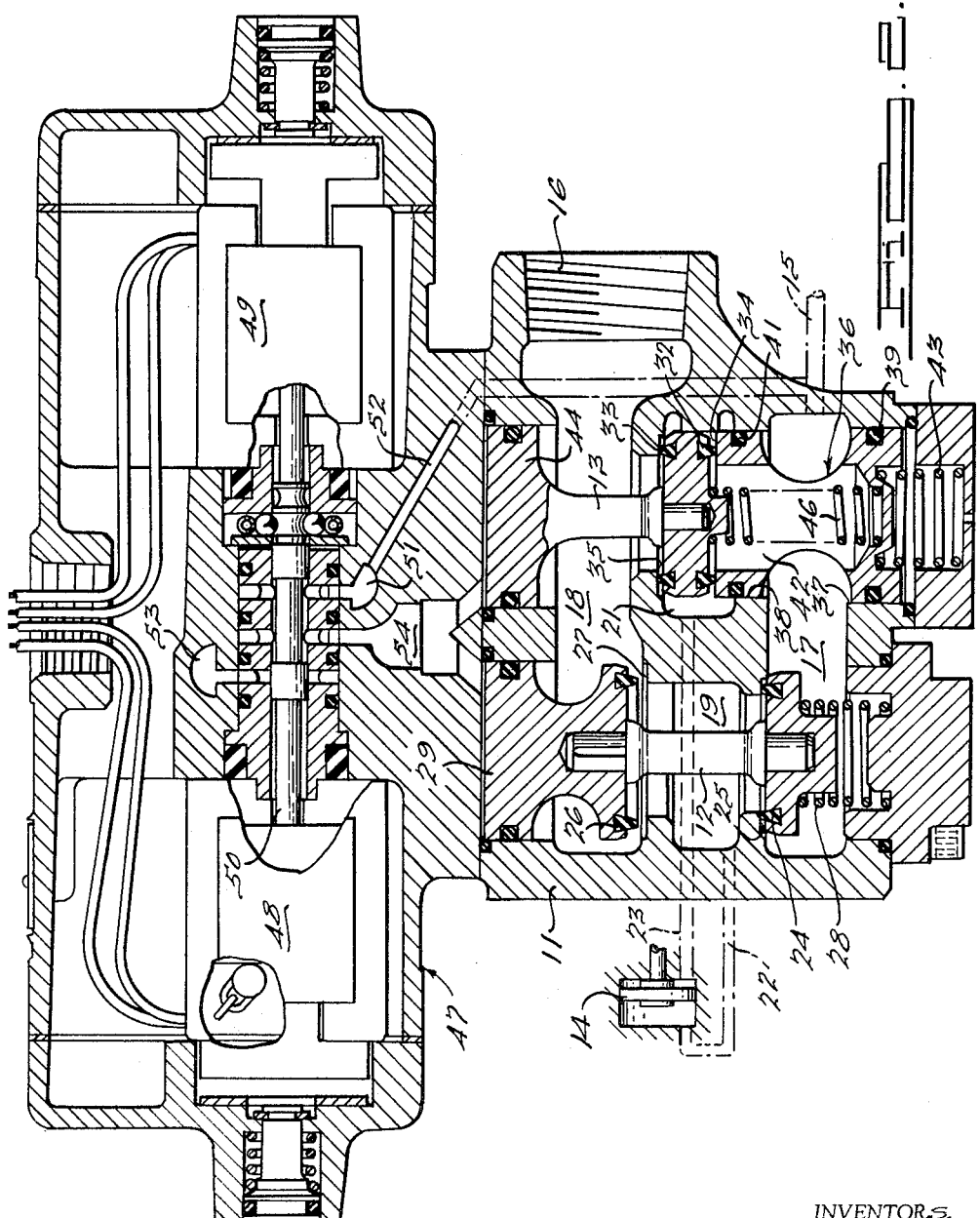

3,194,266
DEVICE FOR PREVENTING MOMENTARY TRANS-
MISSION OF PRESSURE THROUGH NORMALLY
OPEN VALVE
Daniel B. Abbott, Clawson, and Robert J. Kinsler, Harper
Woods, Mich., assignors to Ross Operating Valve Com-
pany, Detroit, Mich., a corporation of Michigan
Filed Feb. 20, 1963, Ser. No. 259,903
9 Claims. (Cl. 137—596.16)

This invention relates to valves, and more particularly to devices for preventing the inadvertent momentary transmission of fluid pressure through a normally open main valve when the supply pressure to both the main and pilot valves is temporarily depleted and then restored.

A "normally open main valve" conventionally refers to a main valve having a supply port and a working or outlet port, the main valve being controlled by a pilot valve with an energized and a deenergized position. In its energized position the pilot valve is actuated by some selectively applicable outside force, such as a solenoid or fluid or manual pressure, and in the deenergized position this force is removed. The arrangement is such that when the pilot valve is in its deenergized position the supply and outlet ports of the main valve will be connected, and when the pilot valve is energized, they will be disconnected. In a "normally closed" valve, on the other hand, the supply and outlet ports are disconnected when the pilot valve is deenergized, and connected when it is energized.

It is an object of the invention to provide a novel and improved valve construction which will prevent the momentary transmission of fluid pressure through a normally open main valve when such valve is temporarily shifted to its open condition because of loss of pressure supply to the pilot valve which operates the main valve, and is then returned to its closed position upon restoration of supply pressure.

It is a further object to provide an improved valve construction of the above nature which is of relatively simple construction, is reliable in use, and may be applied to existing valve constructions without complicated design changes being necessary.

Other objects, features, and advantages of the present invention will become apparent from the subsequent description, taken in conjunction with the accompanying drawings, in which:

FIGURE 1 is a partially schematic cross-sectional view showing the invention as applied to the normally open valve of a pair of 3-way pilot operated main valves, the valves being shown with the pilot valve in its open position and with adequate supply pressure available, and FIGURE 2 is a view similar to FIGURE 1 but showing the position of the parts upon temporary loss of supply pressure.

In general terms, the illustrated embodiment of the invention comprises a spool shown as mounted in the body or housing of a pair of 3-way valves which act as a 4-way valve for controlling a double acting fluid motor, one valve being normally open and the other normally closed. The main valves are simultaneously pilot operated, and the invention is applied to the normally open valve. The spool has a surface acting as a valve seat for the inlet side of the normally open valve, and a pair of seal rings of different effective areas so that the supply pressure tends to hold the spool in a normally inoperative position against the action of a spring which urges the spool toward the valve member. As long as the supply pressure remains above a predetermined level, the spool carrying the valve seat of the normally open main valve will remain in position, the normally open valve reciprocating in accordance with pilot valve control.

However, should the supply pressure be depleted or removed at the pilot and main valves while the normally open valve is in its closed position, the spool carrying the inlet valve seat will follow the normally open main valve so that the seat bears against the inlet valve element. The inlet side of the normally open valve will therefore stay closed, and when pressure is restored, the seat will maintain its engagement with the inlet valve element while the normally open main valve returns to its closed position, preventing momentary pressure flow to the outlet port which might otherwise occur.

Referring more particularly to the drawings, a main valve body or housing 11 is shown having a pair of main valves 12 and 13 for controlling a double acting fluid motor 14. Valves 12 and 13 are piston operated and are mounted in parallel relation within housing 11, the housing having an inlet or supply port indicated schematically at 15 and an exhaust port 16. Inlet port 15 leads to a common supply chamber 17 in housing 11 for valves 12 and 13, while a common exhaust chamber 18 is provided for both valves above chamber 17 and connected with exhaust port 16. A working or outlet chamber 19 is provided for valve 12 between chambers 17 and 18, a similar outlet chamber 21 being provided for valve 13. Chamber 19 is provided with conduit means indicated schematically at 22 leading to one side of motor 14, while chamber 21 is provided with a conduit indicated schematically at 23 leading to the other side of the motor.

Valves 12 and 13 are both poppet type 3-way valves, valve 12 being a normally closed type and valve 13 a normally open type. Valve 12 is provided with an inlet valve element engageable with a seat 25 between chambers 17 and 19, and an exhaust valve element 26 engageable with a valve seat 27 between chambers 19 and 18. A helical coil compression spring 28 is disposed between housing 11 and valve 12, urging the valve toward its closed position in which element 24 engages seat 25 and element 26 is separated from seat 17 to connect chambers 18 and 19. A piston 29 is disposed at the upper end of valve 12 within a chamber 31 for operating the valve.

Valve 13, being a normally open 3-way valve, has a pair of valve elements 32 and 33 in chamber 21, element 32 being an inlet valve element and engageable with a valve seat 34 forming part of the invention as later described. Exhaust valve element 33 is engageable with a fixed valve seat 35 between chambers 21 and 18. Valve seat 34 is carried by a spool-shaped member generally indicated at 36 which is slidably mounted within housing 11, and more particularly within a first bore 37 in the lower end of the housing and a second bore 38 in a portion of the housing between chambers 17 and 21. Bore 37 has a greater diameter than bore 38, and an annular seal 39 is carried by member 36 and slides within bore 37, a seal 41 being carried by the upper end of member 36 and slidable within bore 38. The central portion of member 36 is connected to chamber 17 and forms a passage 42 leading from chamber 17 through valve seat 34.

A helical coil compression spring 43 is provided between the vented housing bottom and member 36, urging member 36 upwardly against valve element 32. The differential area between seals 39 and 41 is such as to counteract the force of spring 43. This differential area is greater than that necessary to overcome spring 43 at the minimum desired line pressure. As pointed out below, however, the differential area should not be so great as to cause seat 34 to shift away from element 32 and permit fluid flow which might momentarily shift motor 14.

A piston 44 is provided at the upper end of valve 13 and is disposed within a chamber 45. A helical coil compression spring 46 is disposed within member 36 and is engageable at its lower end with the bottom portion of this member, the upper end being engageable with valve 13 to urge the valve upwardly.

The assembly is shown as provided with a pilot valve generally indicated at 47, this valve being a 3-way spool valve shiftable between supply and exhaust positions by two alternately operable solenoids 48 and 49. Valve spool 50 of valve 47 is provided with a supply port 51 connected by a conduit 52 to supply port 15. Spool 50 is also provided with an exhaust port 53 and an outlet port 54, the latter being connected to chambers 31 and 45.

In operation, pilot valve 47 will normally be shifted between a left-hand position (not shown) and a right-hand position as shown in FIGURES 1 and 2, the valve in its right-hand position connecting supply port 51 with outlet port 54 and thereby urging valves 12 and 13 downwardly into the FIGURE 1 position as long as sufficient line pressure is available. When in this position, valve element 26 of valve 12 will engage seat 27, valve element 24 being separated from seat 25 to connect supply chamber 17 to outlet chamber 19. Valve element 32 of valve 13 will engage seat 34 while valve element 33 is separated from seat 35, thereby connecting outlet port 21 to exhaust port 16. The result will be that motor 14 will shift to its right-hand position as shown in FIGURE 1.

It should be noted at this point that as long as the supply pressure in chamber 17 is maintained at a minimum value, member 36 will be held in its lower or normal position with its lower end engaging housing 11, as shown in FIGURE 1, due to the area differential between seals 39 and 41 creating a force which overcomes the force of spring 43.

Upon shifting of pilot valve 47 to its left-hand position, outlet port 54 will be connected to exhaust port 53, exhausting chambers 31 and 45. Valve 12 will move upwardly under the urging of spring 28 and the pressure in chamber 17, causing inlet valve element 24 to engage seat 25 and exhaust valve element 26 to separate from seat 27. At the same time, valve element 33 of valve 13 will engage seat 35 and valve element 32 will move away from seat 34. The latter action will occur because member 36 is still maintained in its lower position for the reasons given above. Motor 14 will thus shift to its left-hand position.

FIGURE 2 shows what occurs when supply pressure is depleted or entirely removed from supply port 15 while pilot valve spool 50 is in its right-hand position. Valves 12 and 13 will shift upwardly because of the depletion of pressure in chambers 31 and 45, respectively, just as if pilot valve spool 50 had been shifted to its left-hand or exhaust position. However, the loss of pressure in chamber 17 will permit spring 43 to urge member 36 upwardly to its FIGURE 2 position in which seat 34 maintains its engagement with valve element 32. Motor 14 will remain in its right-hand position which it had attained before the loss of pressure, and pilot valve spool 50 will of course remain in its right-hand position because the loss of pressure will not have affected its control by solenoids 47 and 48.

Upon restoration of the line pressure at supply port 15, valves 12 and 13 will begin shift downwardly, valve 12 to return to its open position and valve 13 to its closed position. Since valve 12 is moving to a position in which pressure will be reapplied to the motor, any transitory pressure or flow phenomena during its movement will be unimportant as far as the position of motor 14 is concerned. However, if valve element 32 of valve 13 had been separated from its seat while valve 13 was in its upper position, some fluid could get past valve element 32 and into conduit 23 before the valve element reached its fully engaged position. This could cause slight shifting of motor 14 away from its right-hand position. Of course, the motor would be returned soon thereafter when valve 12 reaches its fully open position and valve 13 its fully closed (exhaust) position, but the momentary shifting could, in some installations, be unacceptable.

According to the present invention, however, seat 34 of member 36 will maintain its engagement with element 32 during the downward movement of valve 13 until the parts arrive at the position shown in FIGURE 1. In a typical installation, the effective areas of seals 39 and 41 are such that the differential area will not be capable of overcoming spring 43 and the static seal friction until a pressure of approximately 30 p.s.i.g. is reached or until the pressure in chamber 45 is sufficient to move valve 13 to its lower position, the latter pressure being somewhat lower than 30 p.s.i.g. As long as a supply pressure of 30 p.s.i.g. or greater is available, member 36 will remain in its lower position, and valves 12 and 13 may again function in their normal manner by control of pilot valve 47. In such an installation, the strength of spring 43 will of course be sufficient to overcome the force of spring 46, the friction of seals 39 and 41, the weight of member 36, and the pressure differential between seals 39 and 41 when the pressure in chamber 17 drops below approximately 30 p.s.i.g.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. In combination, a normally open reciprocable valve having a valve element engageable with a seat, a supply chamber and an outlet chamber for said valve, a reciprocable member carrying said seat, means constantly urging said member in a direction to cause said seat to engage said valve element, and pressure differential means responsive to the maintenance of a predetermined pressure in said supply chamber for overcoming said urging means.

2. In combination, a reciprocable valve having a valve element and a seat element, a supply chamber and an outlet chamber for said valve, a reciprocable member carrying said seat element, pressure differential means formed on said member and responsive to the maintenance of a predetermined pressure in said supply chamber to urge said member in a direction such that said seat element is urged away from said valve element to thereby hold said member in an inoperative position, and resilient means urging said member toward a position causing said seat element to engage said valve element.

3. In combination, a valve having a reciprocable valve element and a seat, a supply chamber and an outlet chamber for said valve, a spool member slidably mounted in said supply chamber and carrying said seat, a first seal area on said spool member exposed to said supply chamber and responsive to pressure therein to urge said spool member in a direction causing said seat to engage said valve element, a second seal area carried by said spool member and exposed to said supply chamber, said second seal area being greater than said first seal area and responsive to pressure in said supply chamber to urge said seat in a direction away from said valve element, and resilient means constantly urging said spool member in a direction causing said seat to engage said valve element, the relative sizes of said spool member seal areas being such that the differential area will create a force sufficient to counteract said resilient means as long as a predetermined pressure is maintained in said supply chamber.

4. In combination, a piston operated normally open main valve having a reciprocable valve element, a supply chamber, and an outlet chamber, a pilot valve having a supply port and an outlet port, said supply chamber and said pilot valve supply port being connected to a common source of supply pressure, a piston for said main valve connected to the pilot valve outlet port, and a movable seat for said valve element comprising a reciprocable member, pressure differential means connected to said member and exposed to pressure in said supply chamber, said pressure differential means tending to urge said seat away from said valve element, and resilient means constantly urging said seat toward said valve element, said differential area being sufficient to overcome said resilient means as long as a predetermined pressure is maintained in said supply chamber.

5. In combination, a main valve comprising a piston, a poppet type valve element facing away from said piston, a valve housing having a supply chamber, an outlet chamber, and a chamber for said piston, said outlet chamber being disposed between said supply chamber and said piston chamber, a first bore in said housing between said supply and outlet chambers, a second bore in said housing on the side of said supply chamber remote from said outlet chamber, a reciprocable seat member having seals slidable in said bore, the effective area of the seal in said second bore being greater than the effective area of the seal in the first bore, a seat surface formed on said seat member and facing said valve element, a passageway in said seat member connecting said supply chamber to the interior of said seat surface, and resilient means constantly urging said seat member in a direction causing said seat surface to engage said valve element, the relative sizes of said bores being such that the force created by a predetermined pressure in said supply chamber will counteract said resilient means.

6. The combination according to claim 5, further provided with a spring disposed between said seat member and said valve element and urging said seat member and valve element apart.

7. In combination, a piston operated 3-way normally open poppet valve comprising a housing, an inlet valve element and piston reciprocably mounted in said housing and connected to each other, a piston chamber for said piston, a supply chamber in a portion of said housings remote from said piston chamber, an exhaust chamber in said housing adjacent said piston chamber, an outlet chamber in said housing between said supply and exhaust chambers, an exhaust valve seat between said outlet and exhaust chambers, a movable inlet valve seat member slidably mounted in said housing, first and second seal areas on said seat member and exposed to pressure in said supply chamber, the first seal area being larger than the second and being responsive to supply chamber pressure to urge said seat member away from said inlet valve element, said second seal area being responsive to supply chamber pressure to urge said seat member toward said inlet valve element, and resilient means constantly urging said seat member toward said inlet valve element, the strength of said resilient means being such that said seat member will follow said inlet valve element when the pressure in said supply chamber drops below a predetermined amount.

8. In combination, a pair of 3-way piston operated main valves, the first valve being normally closed and the second valve normally open, a pilot valve for simultaneously actuating said main valves, a common supply port for said main and pilot valves, said normally open valve having inlet and exhaust valve elements, a normally inactive movable seat for said inlet valve element, pressure differential means responsive to pressure at said supply port for urging said seat away from said inlet valve element toward a normal position, and resilient means constantly urging said seat toward said valve element, the strength of said resilient means being sufficient to overcome said pressure differential means when the presusre at said supply port drops below a predetermined level.

9. The combination according to claim 8, the inlet and exhaust valve elements on said normally open valve being of a poppet type and facing in opposite directions, said movable seat comprising a spool member having its interior exposed to supply port pressure, said pressure differential means comprising first and second seal areas on said spool constantly exposed to supply port pressure, and a spring between said seat and said valve member urging said seat and said valve member apart.

References Cited by the Examiner
UNITED STATES PATENTS

| | | | |
|---|---|---|---|
| 2,646,820 | 7/53 | McLeod | 137—596.15 |
| 2,700,986 | 2/55 | Gunn | 137—596.16 |
| 2,739,613 | 3/56 | Kulikoff | 137—625.27 |
| 2,825,362 | 3/58 | Hicks | 137—596.16 |
| 2,906,246 | 9/59 | Di Tirro et al. | 91—433 X |

M. CARY NELSON, *Primary Examiner*.